July 19, 1949.　　　　R. W. SMITH　　　　2,476,460
FRICTION DRIVE TRACK
Filed April 28, 1948

Inventor
Robert W. Smith
By
Atty.

Patented July 19, 1949

2,476,460

UNITED STATES PATENT OFFICE 2,476,460

FRICTION DRIVE TRACK

Robert W. Smith, Copley, Ohio, assignor to The B. F. Goodrich Company, New York, N. Y., a corporation of New York Application April 28, 1948, Serial No. 23,722

9 Claims. (Cl. 305—10)

1

This invention relates to friction drive tracks for self-laying track type vehicles. The simplicity and economy of friction drive track installations makes them desirable for endless track vehicles. However, because the tracks are driven by friction the efficiency of the track drive is reduced by slippage between the drive sheave and track, especially under wet conditions when excessive slippage has often occurred with prior constructions. Mud and water is picked up by the friction-driven surfaces of the track and is carried to the drive sheave causing slippage between the track and drive sheave.

It is an object of this invention to improve the frictional driving efficiency of friction drive tracks and to eliminate objectionable slippage thereof under wet or muddy conditions.

Further objects are to provide for effective ejection of mud and water and other foreign matter from the driving and driven surfaces, to provide a plurality of gripping edges in the track surfaces, and to provide simplicity of design and construction and efficiency in operation.

These and other objects will be apparent from the following description, reference being had to the drawings in which.

Figure 1:
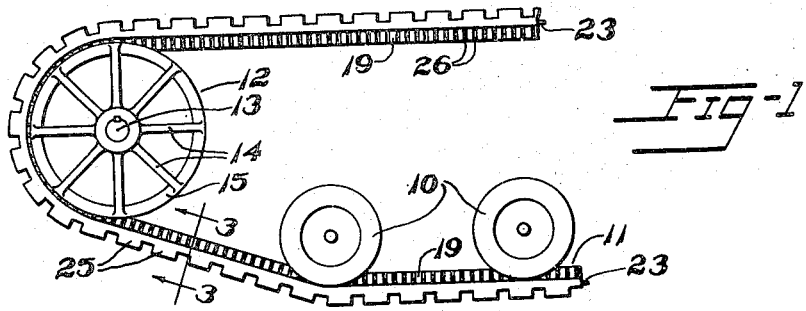
Fig. 1 is an elevation of a track and sheave assembly constructed in accordance with and embodying the invention, parts being broken away.

A portion of a wheel and track arrangement for a track-laying vehicle is shown at Fig. 1. Supporting sheaves such as bogie wheels 10, 10 are disposed at the lower portion of the vehicle for supporting the vehicle on the track 11. A drive sheave 12 is disposed forward of and above the bogie wheels 10, 10 for driving the track 11. The drive sheave 12 may be mounted on and keyed to a drive shaft 13 which is connected to an engine or other power source (not shown).

The drive sheave 12 has a hub with spokes 14, 14 extending radially outward to flanges 15, 15 which are engageable with the track 11. The flanges 15, 15 have pairs of opposing smooth faces 16 and 17 converging radially inward of the sheave 12 and providing wedge-shaped grooves for receiving ribs of the track 11. The grooves are preferably open at the base portion and the spokes 14, 14 are recessed at the base of the grooves to provide continuity of the opening and facilitate ready removal of mud and water.

The track 11, which may be endless in section, has a relatively flat flexible band or body portion 18 of resilient rubber or other rubber-like material with a ground engaging face and a sheave-engaging face. At the sheave-engaging face of

2 the track longitudinal ribs 19, 19 are located for entering and engaging the faces 16 and 17 of the flanges 15, 15 and each rib 19 has inclined side faces 20 and 21 for frictionally engaging the converging faces of the flanges with a wedging action.

The track 11 may be suitably reinforced to provide a strong durable structure. Longitudinal tension-resisting elements such as wire cable reinforcements 23, 23 are built into the body portion 18 in the region of the ribs 19, 19 for resisting longitudinal stretching of the track 11 and for urging the ribs into the grooves of the drive sheave 12. Layers of woven fabric or laterally extending cords 24, 24 to hold the cables 23, 23 in properly spaced relation and strengthen the track 11 laterally are built into the body portion and additional narrow plies 24, 24 may extend into the extremities of the track to provide solidity and strength. At the ground engaging face of the track a tread 25 may be incorporated with cross ribs or other raised traction lugs for gripping the ground.

Figure 2:
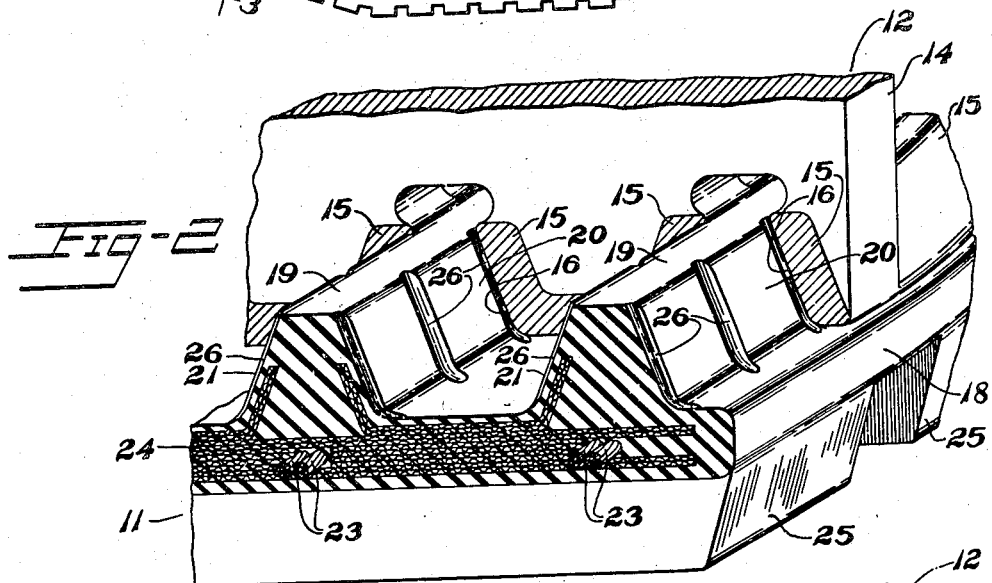
Fig. 2 is a perspective view of the track and driving sheave shown in Fig. 1 at a position of engagement, parts being sectioned and broken away.
Figure 3:
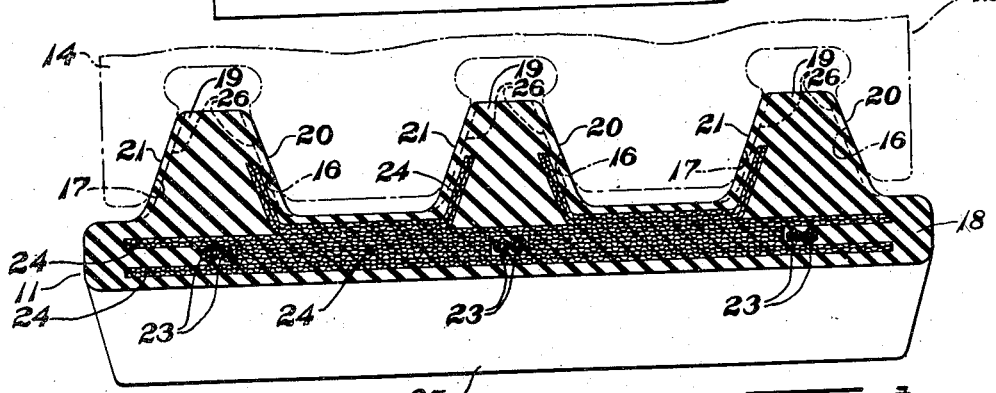
Fig. 3 is a section taken along line 3—3 of Fig. 1.

The side faces 20 and 21 of the ribs are indented at spaced-apart positions longitudinally thereof providing transversely extending channels 26, 26 in the driving surfaces. As shown in Fig. 2 the channels 26, 26 preferably extend across the side faces 20 and 21 of the ribs 19, 19 from the body portion 18 at the base or the bottom of the ribs to the top surfaces of the ribs so as to be in communication with the top surfaces of the ribs and the continuously open space there provided. This makes possible drainage of mud and water from the side faces 20 and 21 even at positions where the drive sheave 12 is in engagement with the track 11. Mud and water is forced out from between the engaging surfaces of the ribs 19, 19 and track 11 to assure good gripping conditions at all times. The track 11 engages the drive sheave 12 with the base of the ribs 19, 19 in spaced relation to the outer periphery of the flanges 15, 15 providing a space into which mud and water conducted by the channels 26, 26 may be ejected.

While the shape of the channels 26, 26 may be varied considerably good results may be obtained with channels which are semi-circular and terminate in edges providing gripping action on the drive sheave 12.

The body portion 18 and the reinforcing fabric and metal elements are preferably bonded together by vulcanization or the like process providing a unitary structure.

In operation, the track 11 is supported and carried by the bogie wheels 10, 10 and by the drive sheave 12. Under some conditions ribs 19, 19 of the track 11 are covered with mud, water and other foreign material as the vehicle moves along the ground. This foreign material may be carried to the drive sheave 12 and tends to form a lubricating film between the faces 16 and 17 of the flanges 15, 15 and the side faces 20 and 21 of the ribs 19, 19. The foreign material is forced into the channels 26, 26 by the pressure between the ribs 19, 19, and the faces 16 and 17 of the grooves. The channels 26, 26 can therefore conduct the material away into the spaces at both the top and base of the ribs 19, 19. The edges of the channels 26, 26 moreover serve to increase the grip on the smooth faces 16 and 17 of the flange 15, 15 and under tendency to slip, the edges wipe the faces of the flanges thus maintaining a clean driving surface.

Variations may be made without departing from the scope of the invention as it is defined in the following claims.

I claim:

1. A friction drive track for a self-laying track-type vehicle comprising a flexible band, a longitudinal rib at the inner surface of said band for driving engagement in a smooth-faced groove of a drive sheave, said rib having channels in the driving contact surface thereof at positions spaced-apart along the rib and extending to positions beyond said contact surface for egress of foreign material from between the contact surfaces of said sheave and said rib.

2. A friction drive track for a self-laying track-type vehicle comprising a flexible band, a longitudinal wedge-shaped rib at the inner surface of said band for engagement of its side faces with the side faces of a smooth-faced tapered groove of a sheave, said rib having channels in the contact faces thereof at positions spaced-apart along the rib and extending transversely of said faces to positions beyond the contact faces for egress of foreign material from between the contact faces of said sheave and said rib.

3. A friction drive track for a self-laying track-type vehicle comprising a flexible band, a longitudinal wedge-shaped rib at the inner surface of said band for engagement in a smooth-faced tapered groove of a sheave in spaced-relation to the bottom of the groove, said rib having channels in the contact faces thereof at positions spaced-apart along the rib and extending transversely of said faces to positions in communication with the space at the bottom of the groove beyond the contact faces for egress of foreign material from between the contact faces of said sheave and said rib.

4. A friction drive track for a self-laying track type vehicle comprising a flexible band, a longitudinal wedge-shaped rib at the inner surface of said band for driving engagement with smooth-faced tapered flanges of a drive sheave with said band in spaced relation to the peripheries of said flanges, said rib having channels in the driving contact faces thereof at positions spaced-apart along the rib and extending transversely of said faces to positions beyond said peripheries in communication with the space between the latter and said band for egress of foreign material from between the contact faces of said drive sheave and said rib.

5. A friction drive track for a self-laying track type vehicle comprising a flexible band, a longitudinal wedge-shaped rib at the inner surface of said band for driving engagement in a smooth-faced tapered groove in a sheave in spaced-relation to the bottom of the groove and with said band in spaced-relation to the top of the groove, said rib having channels in the driving contact faces thereof at positions spaced-apart along the rib and extending transversely of said faces to positions beyond the contact faces in communication with the spaces at the top and bottom of the grooves for egress of foreign material from between the contact faces of said sheave and said rib.

6. A friction drive track for a self-laying track type vehicle comprising a flexible band, a plurality of parallel longitudinal wedge-shaped ribs at the inner surface of said band for engagement with pairs of adjacent flanges of a drive sheave having smooth opposing faces converging radially inwardly, said ribs having base portions adapted to remain out of engagement with the outer peripheries of said flanges and said ribs having channels in the driving contact faces thereof at positions spaced-apart along the ribs and extending transversely of said faces to positions beyond the contact faces of said ribs at said base portions of said ribs for egress of foreign material from between the contact faces of said flanges and said ribs.

7. In combination, a drive sheave for a self-laying track type vehicle, a track having a longitudinal rib at the inner surface thereof, said sheave having a pair of flanges with smooth opposing faces for driving engagement with said rib, said rib having channels in the driving contact faces thereof at positions spaced-apart along the rib and extending transversely of said faces to positions beyond the contact faces, said sheaves being recessed at the inner peripheries of said flanges and said flanges being open at their inner peripheral edges for egress of foreign material from between the contact surfaces of said drive sheave and said rib.

8. A friction drive track for a self-laying track type vehicle comprising a flexible band, a longitudinal wedge-shaped rib at the inner surface of said band for driving engagement with smooth-faced tapered flanges of a drive sheave with said band in spaced-relation to the inner and outer peripheries of said flanges, a longitudinal reinforcing element embedded in said band in the proximity of said rib to urge said rib radially inward of said sheave against the faces of said flanges and said rib having channels in the driving faces thereof at positions spaced-apart along the rib and extending transversely of said faces to positions beyond said inner and outer peripheries in communication with the space between the latter and said band for egress of foreign material from between the contact faces of said drive sheave and said rib.

9. A friction drive track for a self-laying track type vehicle comprising a flexible band of resilient rubber-like material having a tread face and a driving face, said driving face comprising a plurality of longitudinal wedge-shaped ribs for engagement with pairs of flanges of a drive sheave having smooth opposing surfaces, said ribs having longitudinal reinforcing elements embedded in said band in the proximity of said ribs and reinforcing fabric embedded in said band and extending across said band for lateral stability of the track, and said ribs having channels in the contact surfaces at positions spaced-apart along the ribs and extending to positions beyond the contact surfaces for egress of foreign material from between the contact surfaces of said sheave and said ribs.

ROBERT W. SMITH.

No references cited.